US009479995B2

(12) United States Patent
Metke et al.

(10) Patent No.: US 9,479,995 B2
(45) Date of Patent: Oct. 25, 2016

(54) METHODS AND SYSTEMS FOR MAINTAINING ROUTING TABLES IN AN AD-HOC WIRELESS NETWORK

(71) Applicant: MOTOROLA SOLUTIONS, INC, Schaumburg, IL (US)

(72) Inventors: Anthony R. Metke, Naperville, IL (US); Katrin Reitsma, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 182 days.

(21) Appl. No.: 14/587,032

(22) Filed: Dec. 31, 2014

(65) Prior Publication Data

US 2016/0192274 A1    Jun. 30, 2016

(51) Int. Cl.
*H04W 4/00* (2009.01)
*G06F 15/16* (2006.01)
*H04W 40/24* (2009.01)
*H04W 84/18* (2009.01)

(52) U.S. Cl.
CPC ........... *H04W 40/248* (2013.01); *H04W 84/18* (2013.01)

(58) Field of Classification Search
CPC  H04W 40/248; H04W 84/18; H04W 28/021
See application file for complete search history.

(56) References Cited

U.S. PATENT DOCUMENTS

| 6,704,301 B2* | 3/2004 | Chari ...................... H04L 45/20 370/254 |
| 7,006,453 B1* | 2/2006 | Ahmed ................... H04L 45/02 370/255 |
| 7,339,925 B2  | 3/2008 | O'Neill et al. |
| 7,664,876 B2* | 2/2010 | Garcia-Luna-Aceves ............... G06F 12/1483 709/238 |
| 7,685,288 B2  | 3/2010 | Kakivaya et al. |
| 8,014,370 B2* | 9/2011 | Banerjea ................. H04L 45/26 370/229 |
| 8,665,841 B1* | 3/2014 | Goel ....................... H04L 69/22 370/327 |

(Continued)

FOREIGN PATENT DOCUMENTS

WO    2013008026 A2    1/2013

OTHER PUBLICATIONS

"A Survey of Routing Attacks and Security Measures in Mobile Ad-Hoc Networks", Authored by Sudhir Agarwal, Sanjeev Jain, Sanjeev Sharma, Published in Journal of Computing, Issue 1, Jan. 2011.

*Primary Examiner* — Melanie Jagannathan (57) ABSTRACT

Disclosed herein are methods and systems for maintaining routing tables in an ad-hoc wireless network. In an embodiment, a first node receives, from a second node having a second network address, a first data packet having a third network address as the source address and a fourth network address as the destination address. The first node determines that its server routing table (i) contains a stored server route to the fourth network address and (ii) does not contain a server route to the third network address, and responsively adds, to its server-to-client routing table, a server-to-client route to the third network address with the second network address as the associated next hop. The first node transmits, to the second node at the second network address, a second data packet that has the third network address as the destination address.

20 Claims, 8 Drawing Sheets

(56) References Cited

U.S. PATENT DOCUMENTS

| | | |
|---|---|---|
| 8,751,576 B2 | 6/2014 | Michaelis et al. |
| 8,787,246 B2 * | 7/2014 | Brownrigg ......... H04B 7/18584 370/316 |
| 2003/0204625 A1 * | 10/2003 | Cain ....................... H04L 45/00 709/243 |
| 2004/0233855 A1 * | 11/2004 | Gutierrez ................ H04L 45/00 370/252 |
| 2005/0249215 A1 | 11/2005 | Kelsey et al. |
| 2006/0002354 A1 * | 1/2006 | Kang ....................... H04L 45/20 370/338 |
| 2006/0135205 A1 * | 6/2006 | Metke ............... H04L 29/12018 455/557 |
| 2008/0317047 A1 * | 12/2008 | Zeng ....................... H04L 45/00 370/401 |
| 2010/0157889 A1 * | 6/2010 | Aggarwal ............. H04L 45/125 370/328 |
| 2010/0246480 A1 * | 9/2010 | Aggarwal ............. H04L 45/123 370/328 |
| 2011/0063999 A1 * | 3/2011 | Erdmann ............... H04W 84/18 370/254 |
| 2011/0194415 A1 * | 8/2011 | Bahr ....................... H04L 45/00 370/242 |
| 2013/0088999 A1 * | 4/2013 | Thubert .............. H04W 40/248 370/254 |
| 2015/0098457 A1 * | 4/2015 | Mahendran ........... H04W 48/10 370/338 |

* cited by examiner

| SERVER ADDRESS (402) | NEXT HOP (404) |
|---|---|
| ef:a6:0a:7e | 9b:06:c0:a2 |
|  |  |
|  |  |
|  |  |

406 { rows }   408 t = 0

| CLIENT ADDRESS (502) | NEXT HOP (504) |
|---|---|
| 16:40:eb:f6 | 16:40:eb:f6 |
| a7:d9:98:0a | 16:40:eb:f6 |
|  |  |
|  |  |

506 { rows }   508, 510 t = 0

| CLIENT ADDRESS (502) | NEXT HOP (504) |
|---|---|
| 16:40:eb:f6 | 16:40:eb:f6 |
| a7:d9:98:0a | 16:40:eb:f6 |
| 2d:48:01:f1 | 16:40:eb:f6 |
|  |  | t = 1

| SERVER ADDRESS (402) | NEXT HOP (404) | VALIDATED (902) |
|---|---|---|
| ef:a6:0a:7e | 9b:06:c0:a2 | NO |
| 9b:06:c0:a2 | 9b:06:c0:a2 | NO |
|  |  |  |
|  |  |  | t = 1

*FIG. 9*

METHODS AND SYSTEMS FOR MAINTAINING ROUTING TABLES IN AN AD-HOC WIRELESS NETWORK

BACKGROUND OF THE INVENTION

Wireless-communication devices (hereinafter "nodes") such as cell phones, smart phones, and mobile Wi-Fi hotspots are generally configured with the ability to communicate with other network entities via a wireless network. Well known examples of wireless-communication protocols according to which such wireless networks operate include relatively long-range wireless-communication protocols (e.g., Global System for Mobile Communications (GSM), Long Term Evolution (LTE), and the like), relatively short-range wireless-communication protocols (e.g., Wi-Fi and the like), and/or one or more land mobile radio (LMR) protocols (e.g., European Telecommunications Standards Institute Digital Mobile Radio (ETSI-DMR), Terrestrial Trunked Radio (TETRA), APCO Project 25 (P25), Digital Mobile Radio (DMR), and the like), among numerous other examples.

Nodes in an infrastructure-based wireless network typically communicate over an air interface with a network-dedicated base station such as a base transceiver station (BTS), an eNodeB, a wireless access point, and/or a Wi-Fi router (among other examples). The base station is generally responsible for relaying communication between nodes and/or between other networks (such as the Internet). Respective nodes in an infrastructure-based wireless network typically do not communicate directly with other nodes over an air interface.

An ad-hoc wireless network, in contrast, typically does not include a dedicated base station for relaying communication. Rather, each node in the network functions to relay communication between nodes in the network. A respective node will typically communicate directly with nodes that are within wireless-communication range of the respective node, and will otherwise rely on intermediate nodes to relay communication with network nodes that are not within range of the respective node. Moreover, some nodes can function (often according to various device modes) in both infrastructure-based wireless networks and ad-hoc wireless networks, as is known to those having skill in the relevant art.

The data throughput of an ad-hoc wireless network is typically lower than that of a wired network, and the topology of an ad-hoc wireless network will typically change more frequently than the topology of a wired network. Existing routing protocols are not suitable for ad-hoc wireless networks at least because of their relatively high amount of overhead and their inability to accommodate frequent changes in network topology. Accordingly, for at least these reasons, there is a need for methods and systems for maintaining routing tables in an ad-hoc wireless network.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Described herein are methods and systems for maintaining routing tables in an ad-hoc wireless network. At least one embodiment takes the form of a process carried out by a first node in an ad-hoc wireless network of nodes. The first node has a first network address and the nodes in the ad-hoc wireless network exchange data packets that have respective source and destination addresses. The first node maintains a server routing table of server routes to server nodes in the network, and maintains a server-to-client routing table of server-to-client routes from server nodes in the network to client nodes in the network. Each server route includes a server address and an associated next hop, and each server-to-client route includes a client address and an associated next hop. The first node receives a first data packet from a second node that has a second network address. The first data packet has a third network address as the source address and a fourth network address as the destination address. The first node determines that the server routing table (i) contains a stored server route that includes the fourth network address as the server address and (ii) does not contain a server route that includes the third network address as the server address. In response to making this determination, the first node adds a server-to-client route to the server-to-client routing table. The added server-to-client route includes the third network address as the client address and the second network address as the associated next hop. The first node receives a second data packet that has the third network address as the destination address, and responsively references the added server-to-client route in the server-to-client routing table and accordingly transmits the second data packet to the second node at the second network address.

At least one embodiment takes the form of a first node that includes a wireless-communication interface, a processor, and data storage containing instructions executable by the processor for causing the first node to carry out at least the functions described in the preceding paragraph. Moreover, any of the variations and permutations that are described in the ensuing paragraphs and anywhere else in this disclosure can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and/or characterize such embodiments.

In at least one embodiment, the first node transmits the first data packet according to the stored server route.

In at least one embodiment, the first node receives a first beacon from an advertising node (where an advertising node is defined as a node that transmits such a beacon), where the first beacon identifies the fourth network address as being a server address, and responsively adds the stored server route to the server routing table. Among other possibilities, a beacon could be a standard IEEE 802.11 Beacon Frame, and 802.11 Probe Response Frame, or any other broadcast or multicast message that contains service-availability information, which may be used, at least in part, by nodes to identify server addresses, thus enabling such nodes to distinguish between server nodes and other nodes (e.g., client nodes) in the ad-hoc wireless network.

In at least one embodiment, maintaining the server routing table includes maintaining security indicators of whether or not the respective server routes in the server routing table are validated as having been received from a trusted node. In at least one such embodiment, the first node conditions the transmitting of the first data packet according to the stored server route on having first confirmed that the stored server route is validated.

In at least one embodiment, the first node requests a validation of the stored server route from the advertising node. The first node receives the validation from the advertising node and responsively updates the security indicator associated with the stored server route to indicate that the stored server route is validated.

In at least one embodiment, the first node requests the validation of the stored server route in response to determining that the first beacon does not indicate that the stored server route is validated.

In at least one embodiment, the first node requests the validation of the stored server route in response to receiving from the second node a server-route-validation request that pertains to the fourth network address. In at least one such embodiment, the first node transmits to the second node a server-route-validation response that indicates that the stored server route is validated.

In at least one embodiment, the first node establishes a security association with the advertising node prior to requesting the validation of the stored server route from that node.

In at least one embodiment, the advertising node is a server node that has the fourth network address.

In at least one embodiment, the advertising node is an intermediate node between the first node and a server node that has the fourth network address.

In at least one embodiment, the advertising node is a trusted node to the first node when the first node receives the first beacon from the advertising node. In at least one such embodiment, the first node determines that the first beacon indicates that the stored server route is validated, and responsively updates the associated security indicator to indicate that the stored server route is validated.

In at least one embodiment, the first node, after receiving the first beacon, transmits a second beacon that identifies the fourth network address as being a server address and that includes a next hop associated with the fourth network address.

In at least one embodiment, the first beacon includes a first set of advertised-service data, and the first node includes the first set of advertised-service data in the second beacon. In at least one such embodiment, the first node includes at least one additional, previously received set of advertised-service data in the second beacon. In at least one embodiment, the second beacon indicates that the stored server route is validated.

In at least one embodiment, the fourth network address is a server address of an access-point node that has connectivity to both the ad-hoc wireless network and an infrastructure network. In at least one such embodiment, the first beacon includes advertised-service data pertaining to at least one infrastructure-network service available on the ad-hoc wireless network via the access-point node. In at least one further such embodiment, the access-point node advertises, on the infrastructure network, at least one ad-hoc-wireless-network service available on the infrastructure network via the access-point node. In at least one embodiment, the access-point node functions as a translating node between an infrastructure-network service-advertisement format and an ad-hoc-wireless-network service-advertisement format.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . " And it is for reasons akin to brevity and clarity of presentation that this implied leading clause is not repeated ad nauseum in this detailed description.

Figure 1:
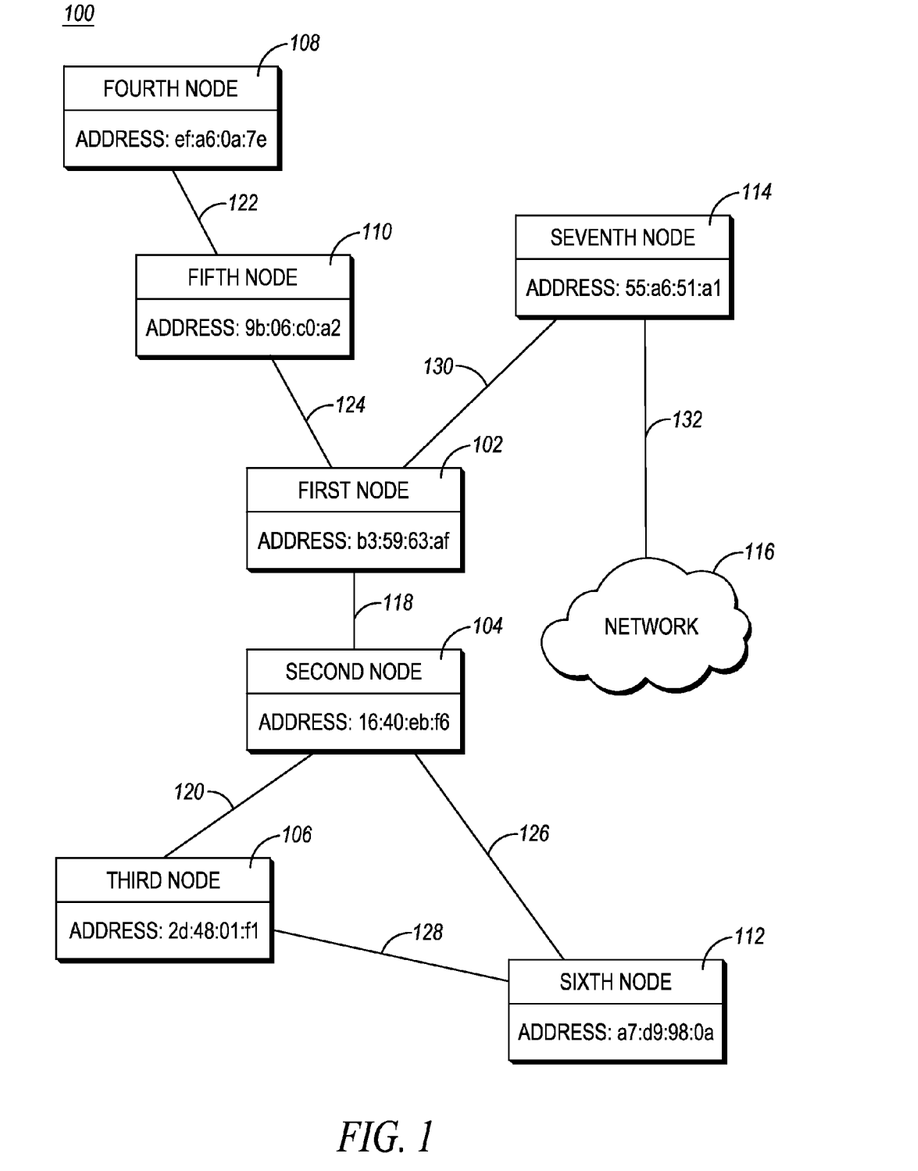
FIG. 1 depicts an example ad-hoc wireless network of nodes, in accordance with at least one embodiment.

FIG. 1 depicts an example ad-hoc wireless network of nodes, in accordance with at least one embodiment. As shown, example ad-hoc wireless network 100 includes first through seventh nodes 102-114, each of which is communicatively connected with one or more of the other nodes in the network 100 via one or more air interfaces 118-130. Network 100 could take the form of a mobile ad-hoc network (MANET), a wireless mesh network, and/or a wireless sensor network, among other examples. It should be understood that network 100 may have a different topology than that shown in FIG. 1, and that network 100 may include different and/or additional nodes, air interfaces, and the like.

By way of example, first node 102 is described more fully below in connection with FIG. 2, though in general any one or more of nodes 102-114 may take the form of respective two-way radios, mobile phones, smart phones, tablet computers, notebook computers, portable media players, loudspeakers, televisions, smart glasses, lapel-worn cameras and/or microphones, surveillance cameras, unmanned aerial vehicles (UAVs), and/or any other devices capable of ad-hoc wireless communication, among numerous other possibilities.

In at least one embodiment, one or more of nodes 102-114 exchange data packets that have respective source and destination addresses. The addresses could take the form of respective media access control (MAC) addresses and/or Internet protocol (IP) addresses, as examples. Those of skill in the art will appreciate that one or more nodes (in addition to first node 102) may have respective network addresses. For example, in the embodiment illustrated in FIG. 1, each of first through seventh nodes 102-114 has a respective network address; thus, first node 102 has first network address b3:59:63:af, second node 104 has second network address 16:40:eb:f6, third node 106 has third network address 2d:48:01:f1, fourth node 108 has fourth network address ef:a6:0a:7e, fifth node 110 has fifth network address 9b:06:c0:a2, sixth node 112 has sixth network address a7:d9:98:0a, and seventh node 114 has seventh network address 55:a6:51:a1.

Air interfaces 118-130 may take the form of respective radio-frequency (RF) air-interface links between directly-connected nodes (i.e., nodes that are each within each other's wireless-communication range). The air interfaces may comply with one or more standards (e.g., Wi-Fi, TETRA, etc.) discussed above, among numerous other possibilities. One or more nodes in network 100 may function to relay communication between other nodes that are not within each other's wireless-communication range, but that are within the wireless-communication range of one or more relaying nodes.

In various different embodiments, a given node in network 100 may function as a gateway to one or more other networks. By way of example, in the embodiment illustrated in FIG. 1, seventh node 114 is connected to a network 116 via a communication link 132, and may function to relay communication between network 116 and other nodes in ad-hoc wireless network 100, thus allowing other nodes in ad-hoc wireless network 100 to communicate with entities outside of the ad-hoc wireless network. Network 116 could be or include a circuit-switched network (such as the Public Switched Telephone Network (PSTN)), a packet-switched network (such as the Internet), and/or any other suitable network or networks. Communication link 132 could include one or more communication devices, networks, connections, switches, bridges, routers, and the like, and could make use of wired and/or wireless forms of communication. Moreover, one or more communication links instead of and/or in addition to communication link 132 could be present.

Figure 2:
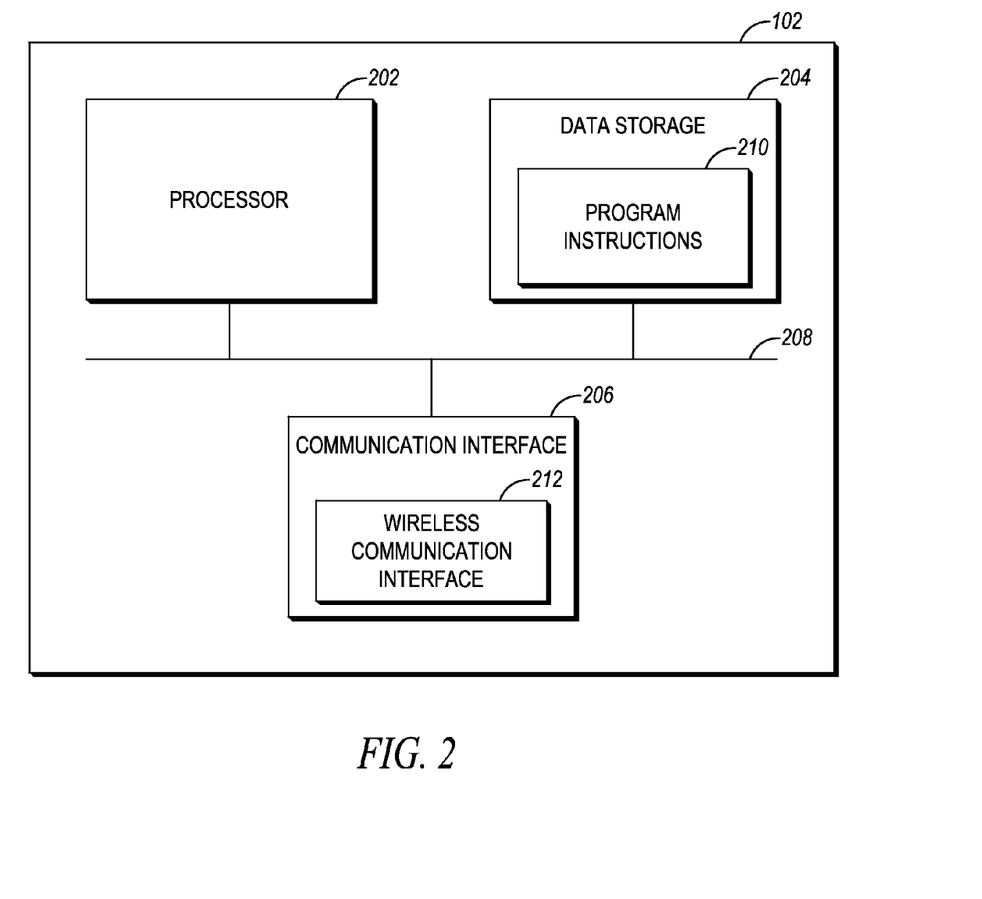
FIG. 2 depicts structural elements of an example node, in accordance with at least one embodiment.

FIG. 2 depicts structural elements of an example node, in accordance with at least one embodiment. In the depicted embodiment, first node 102 includes a processor 202, data storage 204, and a communication interface 206, all of which are interconnected via a system bus 208. Those having skill in the art will appreciate that first node 102 could have additional and/or different components, and perhaps a different arrangement of components, among many other possible variations. Moreover, while depicted and described as being interconnected via a system bus 208, the various components of first node 102 could be interconnected via another suitable communication link, network, or the like. Additionally, in various different embodiments, first node 102 may take the form of a single device or a combination of devices, as deemed suitable by those in the art.

Processor 202 may include one or more processors of any type deemed suitable by those of skill in the art, some examples including a microprocessor and a dedicated digital signal processor (DSP). Data storage 204 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used.

As depicted in FIG. 2, data storage 204 contains program instructions 210 executable by processor 202 for carrying out various functions, though data storage 204 may contain different and/or additional data. In an embodiment in which first node 102 is configured to carry out one or more processes and/or functions (such as the processes and functions described below with reference to FIG. 3), program instructions 210 are executable by processor 202 for carrying out those functions. In instances where other entities described herein (such as other nodes in network 100) have a structure similar to that depicted in and described in connection with FIG. 2, the respective program instructions 210 stored by the respective data storages 204 of those respective devices are executable by their respective processors 202 to carry out functions respectively performed by those devices.

Communication interface 206 (which, in the depicted embodiment, includes a wireless-communication interface 212) may include any necessary hardware (e.g., chipsets, antennas, Ethernet cards, and the like), any necessary firmware, and/or any necessary software for conducting one or more forms of communication. Wireless-communication interface 212 may be configured to communicate according to one or more of the wireless-communication types and/or protocols mentioned above, and/or one or more other types and/or protocols deemed suitable by those having skill in the relevant art for a given implementation or a given context. Communication interface 206 could include a wired-communication interface, which may be configured to communicate according to one or more communication types and/or protocols such as Ethernet, Universal Serial Bus (USB), and the like, and/or one or more other types and/or protocols deemed suitable by those having skill in the relevant art for a given implementation or context. Those having skill in the relevant art will appreciate that communication interface 206 may contain different and/or additional interfaces.

Those having skill in the relevant art will further appreciate that any one or more entities within network 100 (such as any one or more other nodes), any entities connected to network 100 (e.g., via node 114), and/or any other network entities could take a form similar to that of first node 102 as depicted in FIG. 2. As stated, first node 102 may be a single device located within network 100, or may take the form of a distributed computing device whose functionality is divided across multiple devices. And certainly other implementations are possible.

Figure 3:
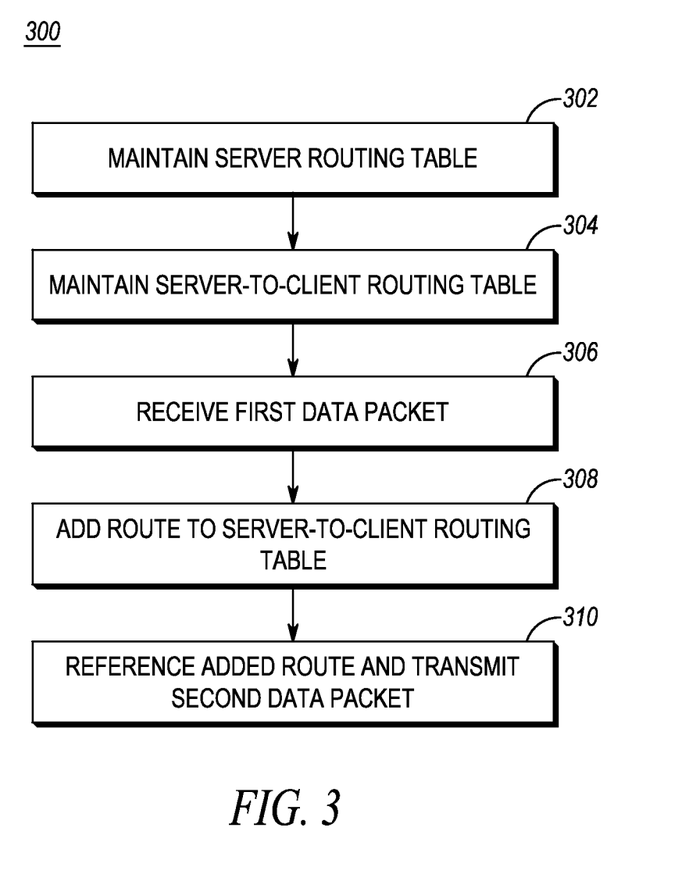
FIG. 3 depicts a flowchart of an example process carried out by a first node in an ad-hoc wireless network of nodes, in accordance with at least one embodiment.

FIG. 3 depicts a flowchart of an example process carried out by a first node in an ad-hoc wireless network of nodes, in accordance with at least one embodiment. In particular, FIG. 3 depicts an example process 300 that is described herein as being carried out by first node 102, though this is by way of example and not limitation, as the process 300 could be carried out by any device or devices deemed suitable by those of skill in the relevant art for a given implementation or context. As described above, first node 102 has first network address b3:59:63:af, and the various nodes 102-114 in network 100 exchange packets that have respective source and destination addresses. It is further noted that one or more of the nodes 102-114 may function as servers in the network 100 (with respect to one or more services such as the Domain Name Service (DNS) by way of example), and that one or more of the nodes 102-114 may function as clients in the network 100, and furthermore that one or more of the nodes 102-114 may function as both a server and a client in the network 100.

At step 302, first node 102 maintains what is referred to herein as a "server routing table," several examples of which are described below and depicted in FIGS. 4 and 9. The server routing table is a table of routes to server nodes in network 100: such routes are referred to in this disclosure as "server routes," and each server route includes a network address of a server node in network 100 (i.e., "a server address") and an associated next hop.

At step 304, first node 102 maintains another routing table that is separate and distinct from the server routing table that is discussed above in connection with step 302. This additional routing table is referred to herein as a "server-to-client routing table," several examples of which are described below and depicted in FIGS. 5 and 7. The server-to-client routing table is a table of routes from server nodes in network 100 to client nodes in network 100: such routes are referred to in this disclosure as "server-to-client routes," and each server-to-client route includes a network address of a client node in network 100 (i.e., "a client address") and an associated next hop.

At step 306, first node 102 receives a first data packet from second node 104, which as described above has the second network address 16:40:eb:f6. In this example, the first data packet has the third network address 2d:48:01:f1 (of third node 106) as the source address and the fourth network address ef:a6:0a:7e (of fourth node 108) as the destination address. An example first data packet is depicted in and described in connection with FIG. 6.

Responsive to receiving the first data packet, first node 102 checks whether its server routing table contains a server route to the third network address 2d:48:01:f1 (of third node 106), and also whether its server routing table contains a server route to the fourth network address ef:a6:0a:7e (of fourth node 108).

At step 308, first node 102 determines that (i) its server routing table does contain a stored server route to the fourth network address ef:a6:0a:7e (of fourth node 108) (i.e., a stored server route that includes the fourth network address ef:a6:0a:7e (of fourth node 108) as the server address of that server route) and (ii) its server routing table does not contain a server route to the third network address 2d:48:01:f1 (of third node 106) (i.e., a server route that includes the third network address 2d:48:01:f1 (of third node 106) as the server address of that server route), and responsively adds a server-to-client route to its server-to-client routing table. The added server-to-client route includes the third network address 2d:48:01:f1 (of third node 106) as the client address of that server-to-client route and the second network address 16:40:eb:f6 (of second node 104) as the associated next hop.

At step 310, first node 102 receives a second data packet, which has the third network address 2d:48:01:f1 (of third node 106) as the destination address, and responsively references the server-to-client route that first node 102 added to its server-to-client routing table at step 308, and first node 102 accordingly transmits the second data packet to second node 104 at the second network address 16:40:eb:f6,which is listed as the next hop that is associated with the client address 2d:48:01:f1 (i.e., the third network address) in the server-to-client routing table of first node 102.

The next portion of this disclosure includes descriptions of FIGS. 4-9, which depict examples of some of the various routing tables and packets that are mentioned in the above description of the example process 300 of FIG. 3.

Figure 4:
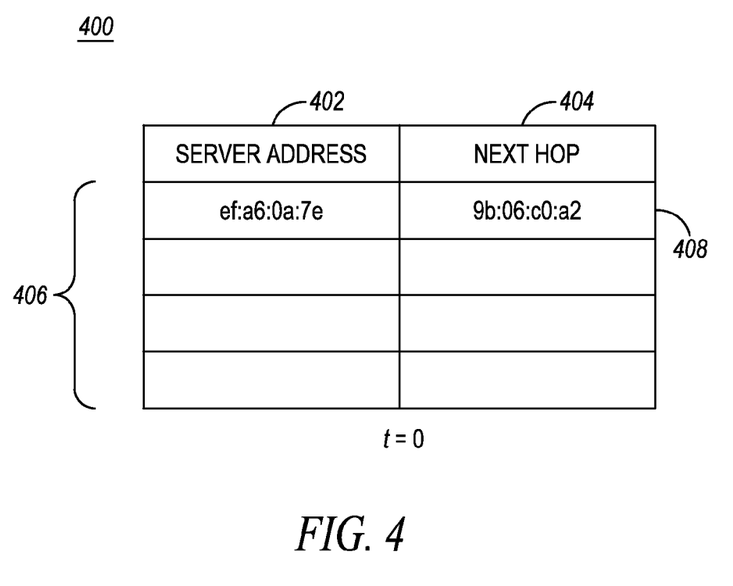
FIG. 4 depicts a first example server routing table, in accordance with at least one embodiment.

FIG. 4 depicts a first example server routing table, in accordance with at least one embodiment. In particular, FIG. 4 depicts an example server routing table 400 that may be stored (and being maintained) by first node 102 at a point in time that is arbitrarily denoted t=0 in FIG. 4. As shown, server routing table 400 includes a set 406 of server routes to server nodes in network 100. At a given time, set 406 could be empty (if, e.g., first node 102 has yet to receive any routing information with which to populate the set) or could include one or more server routes. Each server route in server routing table 400 includes a server address 402 and an associated next hop 404, though in at least one embodiment, one or more of the server routes includes additional information such as respective route metrics (e.g., costs), route flags, and/or security indicators, among numerous other examples that could be listed here.

As can be seen in FIG. 4, at time t =0, server routing table 400 of first node 102 contains a single server route 408, which lists the fourth network address ef:a6:0a:7e (of fourth node 108) as the server address of that server route and the fifth network address 9b:06:c0:a2 (of fifth node 110) as the next hop associated with that server route. Thus, FIG. 4 corresponds to the state of the server routing table of first node 102 at the time that first node 102 carries out at least part of the above-described step 308; i.e., at the time that first node 102 determines that (i) its server routing table does contain a stored server route to the fourth network address ef:a6:0a:7e (of fourth node 108) (i.e., the stored server route 408) and (ii) its server routing table does not contain a server route to the third network address 2d:48:01:f1 (of third node 106).

Figure 5:
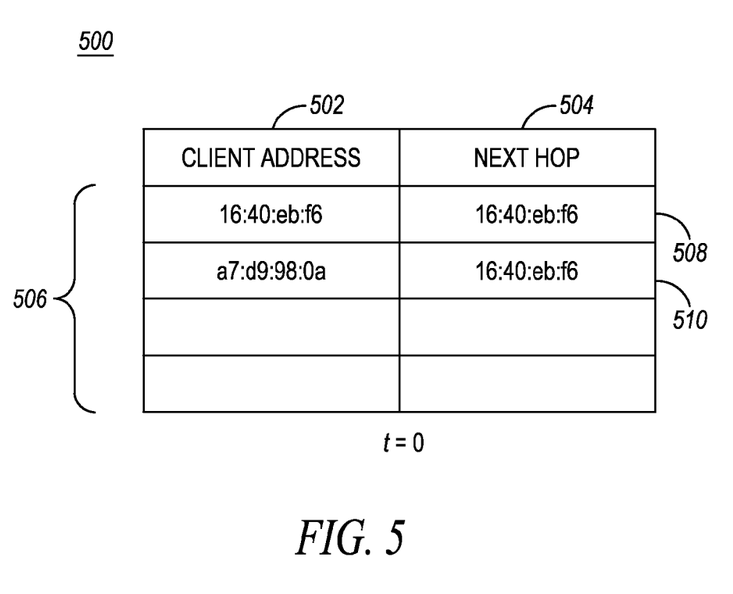
FIG. 5 depicts a first example server-to-client routing table, in accordance with at least one embodiment.

FIG. 5 depicts a first example server-to-client routing table, in accordance with at least one embodiment. In particular, FIG. 5 depicts an example server-to-client routing table 500 that may be stored (and being maintained) by first node 102 at time t=0. As shown, server-to-client routing table 500 includes a set 506 of server-to-client routes from server nodes in network 100 to client nodes in network 100. As with set 406 of server routes, set 506 of server-to-client routes may include zero or more server-to-client routes. Each server-to-client route in server-to-client routing table 500 includes a server address 502 and an associated next hop 504, though one or more of the server-to-client routes could include additional information (such as the additional information described above with reference to FIG. 4).

As can be seen in FIG. 5, at time t=0, server-to-client routing table 500 of first node 102 contains two client-to-server routes 508 and 510. The server-to-client route 508 lists the second network address 16:40:eb:f6 (of second node 104) as the client address of that server-to-client route and also lists the second network address 16:40:eb:f6 (of second node 104) as the next hop associated with that server-to-client route. These two values are the same because first node 102 and second node 104 are only a single hop (communication link 118) from one another. The server-to-client route 510 lists the sixth network address a7:d9:98:0a (of sixth node 112) as the client address of that server-to-client route and the second network address 16:40:eb:f6 (of second node 104) as the next hop associated with that server-to-client route. Thus, FIG. 5 corresponds to the state of the server-to-client routing table of first node 102 prior to the time that first node 102 completes the above-described step 308; i.e., prior to the time that first node 102 adds to its server-to-client table a server-to-client route that includes the third network address 2d:48:01:f1 (of third node 106) as the client address of that server-to-client route and the second network address 16:40:eb:f6 (of second node 104) as the associated next hop.

Figure 6:
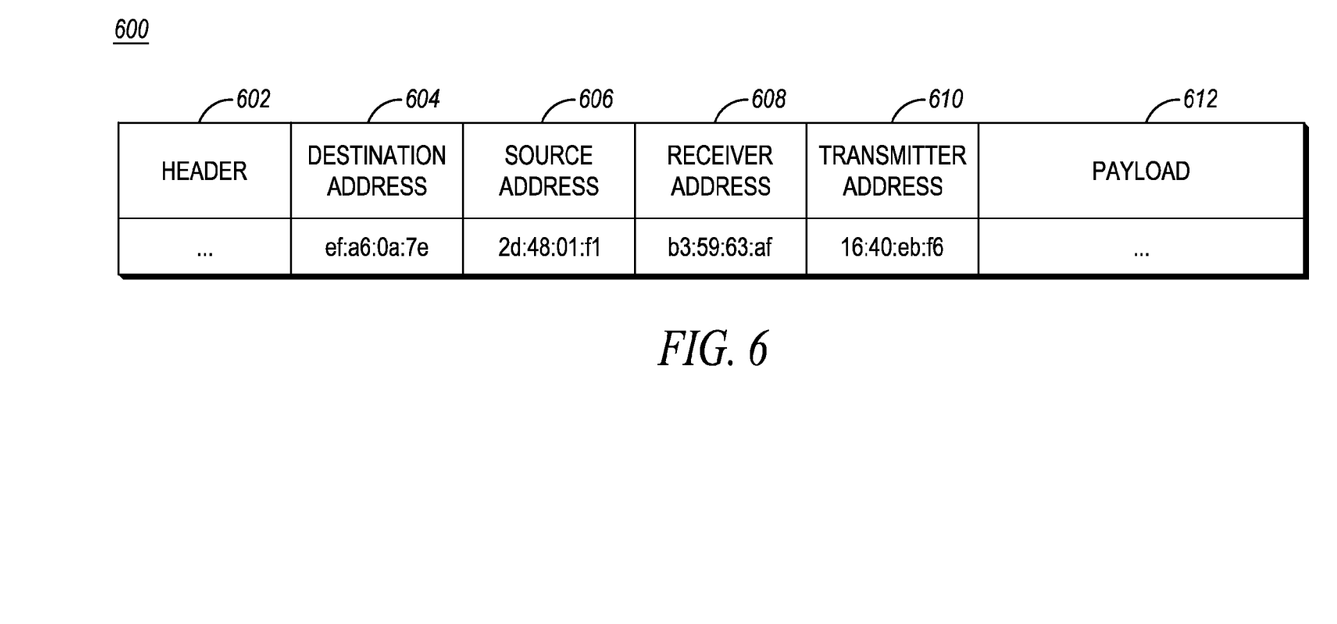
FIG. 6 depicts a first example data packet, in accordance with at least one embodiment.

FIG. 6 depicts a first example data packet, in accordance with at least one embodiment. In particular, FIG. 6 depicts a first example data packet 600, which corresponds to the first example data packet that first node 102 receives from second node 104 at the above-described step 306. The first data packet 600 includes a header 602, a destination address 604, a source address 606, a receiver address 608, a transmitter address 610, and a payload 612. Data packet 600 could take the form of a frame, a datagram, a segment, and/or any other type of data packet, as examples.

Moreover, header 602 may include metadata relating to data packet 600, such as a packet type, a packet priority, etc. For example, header could identify the data packet as a beacon, a service advertisement, a route-validation request, and/or a route-validation response, among numerous other possible examples. Destination address 604 may indicate the network address of a destination node that is to ultimately receive data packet 600, and source address 606 may indicate the network address of a source node that initially created and transmitted data packet 600. Receiver address 608 may indicate the address of a directly-connected receiver node that is to receive data packet 600, and transmitter address 610 may indicate the address of a directly-connected transmitter node that transmitted data packet 600.

Consistent with the above description of step 306, the first data packet 600 has the third network address 2d:48:01:f1 (of third node 106) as its source address 606 and the fourth network address ef:a6:0a:7e (of fourth node 108) as its destination address 604. Moreover, the first data packet 600 has the first network address b3:59:63:af (of first node 102) as its receiver address 608 and the second network address 16:40:eb:f6 (of second node 104) as its transmitter address 610.

Those of skill in the art will appreciate that first data packet 600 may take other forms and could include different and/or additional data. For example, in at least one embodiment, first data packet 600 includes at least one of a sequence-control field and a frame-check-sequence field. Other data packets exchanged by nodes 102-114 could take a form similar to that of first data packet 600.

Figure 8:
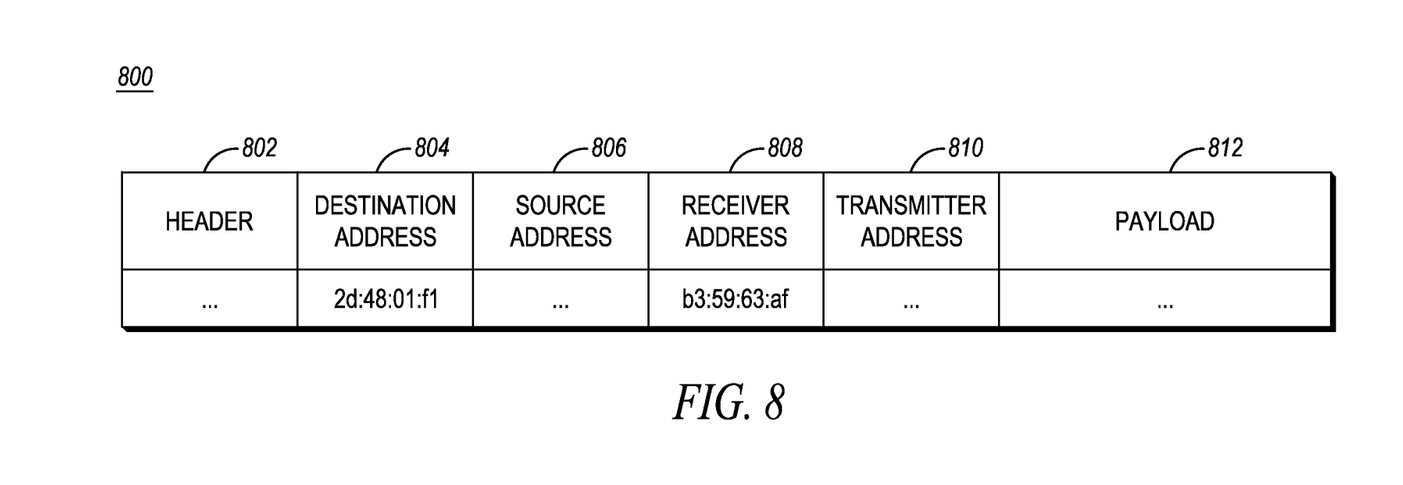
FIG. 8 depicts a second example data packet, in accordance with at least one embodiment.

In general, with respect to both FIG. 6 and FIG. 8, the order and/or arrangement of the various depicted packet elements (including the various addresses (i.e., source, destination, transmitter, receiver)) is not intended to be limiting, and in fact the addresses may appear in any order. Further, in at least one embodiment, all of these addresses pertain to the same layer of the OSI stack; for example, they may all be 802.11 MAC addresses. In the depicted embodiment, data packets 600 and 800 are example MAC-layer frames. In at least one embodiment, the transmitter and receiver addresses are MAC-layer addresses and the source and destination addresses are layer-3 (i.e., network-layer) (e.g., IP) addresses. In embodiments in which the source and destination addresses are layer-3 addresses, the source and destination addresses may be contained in a layer-3 packet contained in the payload (612 or 812) of the packet (600 or 800, respectively). In at least one such embodiment, the receiver address 608 and the transmitter address 610 are each a layer-2 (i.e., MAC-layer) address; that is to say, in at least one such embodiment, the MAC-layer source address is treated as the transmitter address 610 and the MAC-layer destination address is treated as the receiver address 608, while the network-layer source address is treated as the source address 606 and the network-layer destination address is treated as the destination address 604. In still another embodiment, all four of the destination address 604, the source address 606, the receiver address 608, and the transmitter address 610 are network-layer addresses, and data packet 600 is a network-layer packet. And certainly numerous other example implementations could be listed here, and all examples explained using the reference numerals of FIG. 6 could just as well have been explained using the reference numerals of FIG. 8.

In yet another embodiment all four addresses are layer 3 addresses, and data packet 600 depicts a network layer packet.

Figure 7:
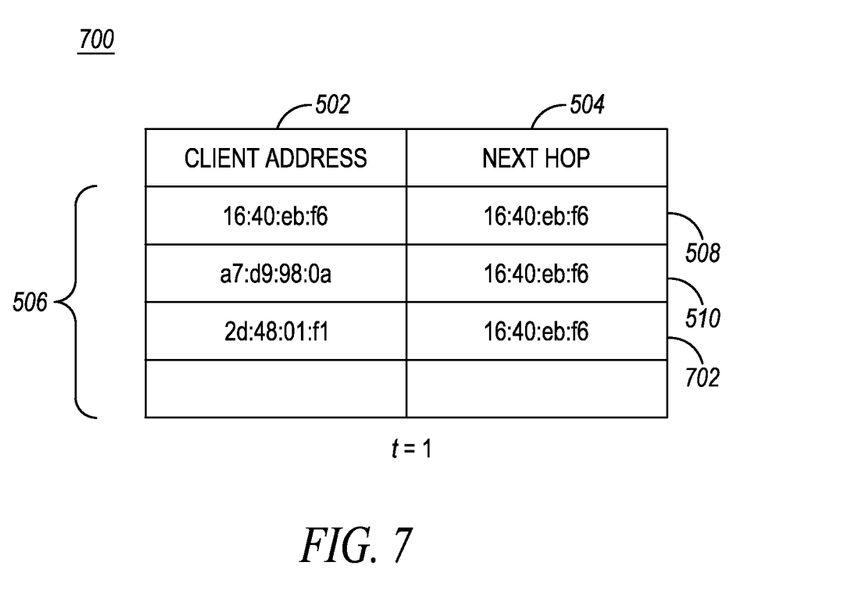
FIG. 7 depicts a second example server-to-client routing table, in accordance with at least one embodiment.

FIG. 7 depicts a second example server-to-client routing table, in accordance with at least one embodiment. In particular, FIG. 7 depicts an example server-to-client routing table 700 that, for the most part, matches the example server-to-client routing table 500 of FIG. 5. Indeed, while the server-to-client routing table 500 is a depiction of the server-to-client routing table 500 of first node 102 at time t=0, the server-to-client routing table 700 of first node 102 at time t=1. Like the server-to-client routing table 500, server-to-client routing table includes the above-described server-to-client routes 508 and 510. The server-to-client routing table 700 also includes an additional server-to-client route 702, which lists the third network address 2d:48:01:f1 (of third node 106) as the client address of that server-to-client route and the second network address 16:40:eb:f6 (of second node 104) as the associated next hop. As such, the server-to-client routing table 700 corresponds to the state of the server-to-client routing table of first node 102 after first node 102 has completed the above-described step 308 (of adding that particular server-to-client route to the server-to-client table).

FIG. 8 depicts a second example data packet, in accordance with at least one embodiment. In particular, FIG. 8 depicts a second example data packet 800, which corresponds to the second example data packet that first node 102 receives at the above-described step 310. It is noted that, as described above, first node 102 also transmits the second data packet at step 310; those of skill in the art will understand that this receive-and-forward sequence does not mean forwarding the received packet without any alterations; indeed, first node 102 receives and forwards the payload of the second packet 800 at least in part by changing the receiver address to whichever next hop first node 102 chooses for that routing action, and further by changing the transmitter address to the first network address b3:59:63:af (of first node 102).

The second data packet 800 has a header 802, a destination address 804, a source address 806, a receiver address 808, a transmitter address 810, and a payload 812. The second data packet 800 of FIG. 8 is similar in a number of ways to the first data packet 600 of FIG. 6, and thus is not described in as much detail. As can be seen in FIG. 8, and consistent with the description of the second data packet that is referenced above in the description of step 310, the second data packet 800 has the third network address 2d:48:01:f1 (of third node 106) as its destination address 804. And consistent with the fact that first node 102 is the recipient in step 310 of the second data packet, the second data packet 800 of FIG. 8 has the first network address b3:59:63:af (of first node 102) as its receiver address 808.

Figure 9:
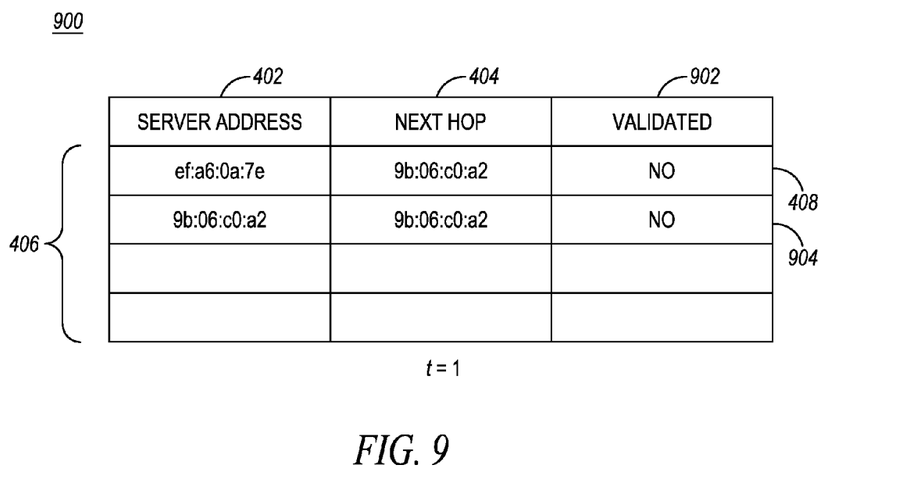
FIG. 9 depicts a second example server routing table, in accordance with at least one embodiment.

FIG. 9 depicts a second example server routing table, in accordance with at least one embodiment. In particular, FIG. 9 depicts a server routing table 900 that includes all aspects of the server routing table 400 of FIG. 4, and that further includes a "Validated" column 902 and an additional server route 904. The server table 400 of FIG. 4 corresponds to the above-referenced example time t=0, while the server table 900 of FIG. 9 corresponds to the above-referenced example time t=1. It is noted that, in at least one embodiment, the first node 102 received a beacon (between time t=0 and time t=1) from the fifth node 110, where that beacon listed the fifth network address 9b:06:c0:a2 (of fifth node 110) as being a server address. And certainly numerous other example fact patterns could be listed here that could result in the first node 102 storing the server routing table 400 of FIG. 4 at time t=0 and storing the server routing table 900 of FIG. 9 at time t=1, which could be any arbitrary amount of time after time t=0.

The server route 904 lists the fifth network address 9b:06:c0:a2 (of fifth node 110) as the server address for server route 904, the fifth network address 9b:06:c0:a2 (of fifth node 110) as the associated next hop for that server route 904, and an indication that server route 904 is not (or has not yet been) validated. As used herein, "validated" means "validated as having been received from a trusted node." The server route 408 also has an indication that it is not (or has not yet been) validated.

Some additional embodiments are further described below, using the reference numerals of FIGS. 1-9 as illustrative examples.

In at least one embodiment, first node 102 transmits first data packet 600 according to the stored server route 408; i.e., first node 102 transmits first data packet 600 to the fifth network address 9b:06:c0:a2 (of fifth node 110), which is the associated next hop of the stored server route 408.

In an embodiment, first node 102 receives, from an advertising node, a first beacon that identifies the network address of fourth node 108 as being a server address, and may responsively add server route 408 to server routing table 400. The advertising node could be an intermediate node (e.g., fifth node 110) between first node 102 and fourth node 108. In other embodiments, the advertising node could instead be a server node (e.g., fourth node 108) that itself has the network address identified in the first beacon as being a server address. After receiving the first beacon, first node 102 may transmit (e.g., to second node 104) a second beacon that identifies the fourth network address ef:a6:0a:7e (of fourth node 108) as being a server address. The second beacon may include a next hop (e.g., the network address of first node 102) associated with the network address of fourth node 108.

The first beacon may include a first set of advertised-service data, and first node 102 may include that set of advertised-service data in the second beacon. First node 102 may also include at least one additional, previously received set of advertised-service data in the second beacon (e.g., advertised-service data received via a third beacon). Any given set of advertised-service data may include a list of services, some examples of which include the above-mentioned DNS, an incident-portal service (which may be a web service (e.g., a dashboard) regarding public-safety incident status, an incident-presence server (which may function as a registrar regarding people and/or devices present at a scene of a given public-safety incident), a multimedia group manager (which may function similar to a presence server for talkgroups), and a context server (which may amalgamate numerous incident-related data points regarding status and well-being of personnel and/or equipment associated with a given public-safety incident), and/or one or more other types of services deemed suitable by those of skill in the relevant art.

First node 102 may determine that the first beacon does not indicate that stored server route 408 is validated, and may responsively request the validation of stored server route 408. Alternatively, first node 102 may determine that the first beacon does indicate that stored server route 408 is validated, and may responsively update the security indicator 902 associated with stored server route 408 to indicate that stored server route 408 is validated. In at least one embodiment, fifth node 110 (the advertising node) is a trusted node to first node 102 when first node 102 receives the first beacon from fifth node 110. Fifth node 110 may become a trusted node by, for example, first node 102 establishing a security association with fifth node 110. In an embodiment, the second beacon (transmitted by first node 102) indicates that the stored server route is validated.

In at least one embodiment, first node 102 requests the validation of stored server route 408 in response to receiving from second node 104 a server-route-validation request that pertains to the fourth network address ef:a6:0a:7e (of fourth node 108). First node 102 transmits to second node 104 a server-route-validation response that indicates that the stored server route is validated. In at least one embodiment, first node 102 establishes a security association with fifth node 110 prior to requesting the validation of stored server route 408 from that node.

In an embodiment, fourth node 108 is an access-point node that has connectivity to both ad-hoc wireless network 100 and an infrastructure network (network 116 in this example). The first beacon (transmitted by fifth node 110, for example) may include advertised-service data pertaining to at least one infrastructure-network service available on ad-hoc wireless network 100 via access-point node 108. In an embodiment, access-point node 108 advertises, on infrastructure network 116, at least one ad-hoc-wireless-network service available on infrastructure network 116 via access-point node 108. Access-point node 108 may function as a translating node between an infrastructure-network service-advertisement format (e.g., DNS-SD) and an ad-hoc-wireless-network service-advertisement format (e.g., IEEE 802.11 beacons containing service advertisement information elements (SAIEs)).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method carried out by a first node in an ad-hoc wireless network of nodes that exchange data packets that have respective source and destination addresses, wherein the first node has a first network address, the method comprising:
    maintaining a server routing table of server routes to server nodes in the network, wherein each server route includes a server address and an associated next hop;
    maintaining a server-to-client routing table of server-to-client routes from server nodes in the network to client nodes in the network, wherein each server-to-client route includes a client address and an associated next hop;
    receiving a first data packet from a second node that has a second network address, wherein the first data packet has a third network address as the source address and a fourth network address as the destination address;
    determining that the server routing table (i) contains a stored server route that includes the fourth network address as the server address and (ii) does not contain a server route that includes the third network address as the server address, and responsively adding a server-to-client route to the server-to-client routing table, wherein the added server-to-client route includes the third network address as the client address and the second network address as the associated next hop; and
    receiving a second data packet that has the third network address as the destination address, and responsively referencing the added server-to-client route in the server-to-client routing table and accordingly transmitting the second data packet to the second node at the second network address.

2. The method of claim 1, further comprising:
    transmitting the first data packet according to the stored server route.

3. The method of claim 2, further comprising:
    receiving from an advertising node a first beacon that identifies the fourth network address as being a server address, and responsively adding the stored server route to the server routing table.

4. The method of claim 3, wherein:
    maintaining the server routing table comprises maintaining security indicators of whether or not the respective server routes in the server routing table are validated as having been received from a trusted node, and
    the first node conditions the transmitting of the first data packet according to the stored server route on having first confirmed that the stored server route is validated.

5. The method of claim 4, further comprising:
    requesting a validation of the stored server route from the advertising node; and
    receiving the requested validation from the advertising node, and responsively updating the security indicator associated with the stored server route to indicate that the stored server route is validated.

6. The method of claim 5, wherein the first node requests the validation of the stored server route in response to determining that the first beacon does not indicate that the stored server route is validated.

7. The method of claim 5, wherein the first node requests the validation of the stored server route in response to receiving from the second node a server-route-validation request that pertains to the fourth network address, the method further comprising:

transmitting to the second node a server-route-validation response that indicates that the stored server route is validated.

8. The method of claim 5, further comprising:

establishing a security association with the advertising node prior to requesting the validation of the stored server route from that node.

9. The method of claim 8, wherein the advertising node is a server node that has the fourth network address.

10. The method of claim 8, wherein the advertising node is an intermediate node between the first node and a server node that has the fourth network address.

11. The method of claim 4, wherein the advertising node is a trusted node to the first node when the first node receives the first beacon from the advertising node, the method further comprising:

determining that the first beacon does indicate that the stored server route is validated, and responsively updating the security indicator associated with the stored server route to indicate that the stored server route is validated.

12. The method of claim 3, further comprising:

after receiving the first beacon, transmitting a second beacon that identifies the fourth network address as being a server address, the second beacon including a next hop associated with the fourth network address.

13. The method of claim 12, wherein the first beacon includes a first set of advertised-service data, the method further comprising:

including the first set of advertised-service data in the second beacon.

14. The method of claim 13, further comprising:

including at least one additional, previously received set of advertised-service data in the second beacon.

15. The method of claim 12, wherein the second beacon indicates that the stored server route is validated.

16. The method of claim 3, wherein the fourth network address is a server address of an access-point node that has connectivity to both the ad-hoc wireless network and an infrastructure network.

17. The method of claim 16, wherein the first beacon includes advertised-service data pertaining to at least one infrastructure-network service available on the ad-hoc wireless network via the access-point node.

18. The method of claim 16, wherein the access-point node advertises, on the infrastructure network, at least one ad-hoc-wireless-network service available on the infrastructure network via the access-point node.

19. The method of claim 16, wherein the access-point node functions as a translating node between an infrastructure-network service-advertisement format and an ad-hoc-wireless-network service-advertisement format.

20. A first node in an ad-hoc wireless network of nodes that exchange data packets that have respective source and destination addresses, wherein the first node has a first network address, the first node comprising:

a wireless-communication interface;

a processor; and data storage containing instructions executable by the processor for causing the first node to carry out a set of functions, the set of functions including:

maintaining a server routing table of server routes to server nodes in the network, wherein each server route includes a server address and an associated next hop;

maintaining a server-to-client routing table of server-to-client routes from server nodes in the network to client nodes in the network, wherein each server-to-client route includes a client address and an associated next hop;

receiving a first data packet from a second node that has a second network address, wherein the first data packet has a third network address as the source address and a fourth network address as the destination address;

determining that the server routing table (i) contains a stored server route that includes the fourth network address as the server address and (ii) does not contain a server route that includes the third network address as the server address, and responsively adding a server-to-client route to the server-to-client routing table, wherein the added server-to-client route includes the third network address as the client address and the second network address as the associated next hop; and receiving a second data packet that has the third network address as the destination address, and responsively referencing the added server-to-client route in the server-to-client routing table and accordingly transmitting the second data packet to the second node at the second network address.

* * * * *